United States Patent [19]

Brown

[11] Patent Number: 4,925,297

[45] Date of Patent: May 15, 1990

[54] THREE-DIMENSIONAL LASER VELOCIMETER SIMULTANEITY DETECTOR

[75] Inventor: James L. Brown, Cupertino, Calif.

[73] Assignee: The United States of America as represented by the Administrator, National Aeronautics and Space Administration, Washington, D.C.

[21] Appl. No.: 257,593

[22] Filed: Oct. 14, 1988

[51] Int. Cl.$^5$ ............................................. G01P 3/36
[52] U.S. Cl. ..................................... 356/28.5; 356/28
[58] Field of Search ................................. 356/28, 28.5; 364/923.4

[56] References Cited

U.S. PATENT DOCUMENTS

| | | | |
|---|---|---|---|
| 3,743,420 | 7/1973 | Iten et al. | 356/28 |
| 4,506,979 | 3/1985 | Rogers | 356/28.5 |
| 4,664,513 | 5/1987 | Watt et al. | 356/28 |

Primary Examiner—Thomas H. Tarcza
Assistant Examiner—Linda J. Wallace
Attorney, Agent, or Firm—Darrell G. Brekke; John R. Manning; Charles E. B. Glenn

[57] ABSTRACT

A three-dimensional laser Doppler velocimeter (10) has laser optics (12) for a first channel positioned to create a probe volume (18) in space, and laser optics (14) and (16) for second and third channels, respectively, positioned to create entirely overlapping probe volumes (20) in space. The probe volumes (18) and (20) overlap partially in space. Photodetector (22) is positioned to receive light scattered by a particle present in the probe volume (18), while photodetectors (24) and (26) are positioned to receive light scattered by a particle present in the probe volume (20). The photodetector (22) for the first channel is directly connected to provide a first channel analog signal (23) to frequency measuring circuits 28. The first channel is therefore a primary channel for the system. Photodetectors (24) and (26) are respectively connected through a second channel analog signal attenuator (42) to frequency measuring circuits (44) and through a third channel analog signal attenuator (50) to frequency measuring circuits (52). The second and third channels are secondary channels, with the second and third channels analog signal attenuators (42) and (50) controlled by the first channel measurement burst signal (35) on line (36). The second and third channels analog signal attenuators (42) and (50) attenuate the second and third channels analog signals only when the measurement burst signal (35) is false.

9 Claims, 6 Drawing Sheets

THREE-DIMENSIONAL LASER VELOCIMETER SIMULTANEITY DETECTOR

ORIGIN OF THE INVENTION

The invention described herein was made by an employee of the United States Government and may be manufactured and used by or for the Government for governmental purposes without the payment of any royalties thereon or therefor.

TECHNICAL FIELD

The present invention relates generally to laser velocimetry. More particularly, it relates to a system and method for the determination of valid simultaneous measurements from the separate channels of a three-dimensional laser velocimeter.

BACKGROUND ART

Three-dimensional laser velocimeter (3D LV) instruments are used to determine the three orthogonal components of velocity (u, v and w) in a fluid flow field. These instruments are composed of three independent one-dimensional laser velocimeter (1D LV) instruments oriented so as to measure different components of fluid velocity ($u_1$, $u_2$ and $u_3$) which are not necessarily orthogonal. The measurements of the three independent 1D LV channels are then combined by way of a coincidence logic means to form the 3D LV measurement system.

Each of the 1D LV instruments is associated with an ellipsoidal probe volume created in space by laser and optical means. Within this probe volume, a set of planar fringes (two or more) are formed optically with known spacing ($d_1$, $d_2$ and $d_3$ fringe spacing for the three independent channels, respectively) and orientation normal to the velocity component measured by the associated 1D LV channel. If a particle travels through a 1D laser velocimeter probe volume, light will be scattered by this particle at an intensity that will vary in time with a frequency that will depend on the fringe spacing and the particle velocity (i.e., fringe crossing time of $t_{d,1} = d_1/u_1$ for channel 1). This light can be detected by means of a photodetector device and its frequency content measured. These scattering particles arrive at random times and are not always present in the probe volume. The photodetector output signal will thus consist of intermittent "bursts" during which time a scattering particle is present in the probe volume and for which time the photodetector output signal may be analyzed for frequency content and the 1D component of particle velocity thereby deduced.

Upon successful measurement of the 1D component of a single particle's velocity by a 1D LV, an event pulse and a digital word or other form of encoded data related to the particle velocity will typically be presented. It is assumed with some justification that the particle travels with the fluid, and the particle velocity is a reasonable approximation of the fluid velocity.

To form the 3D laser velocimeter system, three probe volumes are created optically in space. Each of these probe volumes is associated with an independent 1D laser velocimeter measurement channel. In FIG. 1, we show the typical case where two of the 1D LV systems have their associated probe volumes overlap entirely or nearly entirely (probe volume labeled 20), but with their planar fringes oriented so the velocity components measured by these two 1D LV systems are independent (and often orthogonal). In order that the third measured velocity component be independent of the other two, the ellipsoidal probe volume (labeled 18) associated with the third 1D LV system must be canted at an angle to the probe volumes associated with the other two channels. Hence the third probe volume will overlap only partially with the other two probe volumes if three independent components of velocity ar to be measured.

As a result of this partial overlap and also of possible unsuccessful measurements in any of the laser velocimeter channels, it is necessary to accomplish a coincidence or simultaneity check on the event pulses originating from each of the three 1D laser velocimeter channels in an attempt to ensure that the three measurement systems are reporting data actually obtained from the same particle.

The conventional prior art technique for checking coincidence of the event pulses is the use of a fixed coincidence time window. In this concept, one of several (e.g., three) 1D LV measurement devices will generate a channel event pulse at a time $t_0$ indicating that particular channel has accomplished a measurement. A time window of fixed but operator adjustable duration $t_c$ starts at time $t_0$ during which the remaining channel measurement devices must also generate a channel event pulse. If each of the remaining channels generate a channel event pulse during the time interval ($t_0$, $t_0 + t_c$), then a system event pulse is generated. If one or more of these channels do not generate a channel event pulse during this time interval, then no system event pulse is generated and the data from all channels is disregarded. If the system event is generated, the system event is used to initiate the acquisition of the data from each of the several (e.g., three) 1D LV measurement devices. An additional feature of this prior art is that, once a channel has generated a channel event, further measurements and channel events from that particular channel are inhibited until either the coincidence window time has elapsed or until the system event is generated and the data acquisition system has acquired the desired data from the various measurement devices. In this prior art approach, the individual measurement channels essentially function independently of each other and do not interact except for the above coincidence time window test and the above inhibit function. Further details on the fixed coincidence time window concept are provided in Dean Harrison et al., pending NASA U.S. patent application Ser. No. 725,714, filed Apr. 25, 1985, now U.S. Pat. No. 4,779,222.

Frequency measuring devices exist which are specially designed for measuring the frequency or time period content of the intermittent bursts present in the analog signal of a 1D LV photodetector output. These specialized devices include a spectrum analysis device, a tracking frequency-to-voltage converter and an electronic counter.

In the counter form of these specialized devices, the analog photodetector signal is converted into a digital pulse train, the pulses being related to the passage of the particle through the fringe pattern formed in the probe volume. An additional digital signal may be generated which is "true" when a particle is present in the probe volume and "false" otherwise. This signal may be referred to as the channel measurement burst signal. The digital pulse train may be analyzed for the time period between pulses while the measurement burst is "true". A 1D LV channel event is then generated and 1D LV data (either in digital or analog form, but typically digital) related to the time period or frequency of the digital pulse train is then presented and made available for data acquisition. Additional 1D LV validation schemes, such as a minimum number of pulses in the 1D LV digital pulse train, may be carried out to determine if the event pulse should be generated and if the data output should be updated with the latest data. The frequency tracker form of these frequency measuring devices is similar to the counter, in that a channel event pulse is generated when valid 1D LV data is available, and the data is updated with the latest validated data. The frequency tracker differs from the counter by using a frequency-to-voltage conversion instead of a digital pulse train.

Another form of 1D LV frequency measuring device uses high-speed analog to digital conversion of the 1D LV photodetector signal, which is then stored in a bank of physical memory. The data in physical memory may be processed for presence of a particle in the 1D LV probe volume (analogous to the measurement burst signal) and for frequency content of the photodetector signal (related to the fringe crossing rate of the particle in the 1D LV probe volume) by a CPU using various numerical algorithms.

Further indication of the state of the art in laser Doppler velocimetry and related measuring devices, including the above described techniques, is provided by the following issued U.S. Pat. Nos.: 3,711,200, issued Jan. 16, 1973 to Maughmer; 3,743,420, issued July 3, 1973 to Iten et al.; 3,860,342, issued Jan. 14, 1975 to Orloff et al.; 4,148,585, issued Apr. 10, 1979 to Bargeron et al; 4,373,807, issued Feb. 15, 1983 to Gouesbet; 4,506,979, issued Mar. 26, 1985 to Rogers and 4,527,894, issued July 9, 1985 to Goede et al, and in William D. Gunter, Jr. et al., pending NASA U.S. patent application Ser. No. 846,427, now U.S. Pat. No. 4,697,922, filed Mar. 31, 1986.

While laser Doppler velocimetry is clearly a well developed art, a significant and unrecognized source of error for the three-demensional implementation has been discovered with prior art simultaneity detection. Further improvement in simultaneity detection is therefore required in order to avoid this error.

SUMMARY OF THE INVENTION

Accuracy problems with prior art 3D laser velocimetry measurements have been determined to result from the primary reliance on the fixed coincidence-time-window test described above. One type of error occurs when measurements of the independent 1D LV channels of several different or multiple particles occur close enough in time so as to pass the prior art coincidence-time test and falsely indicate a single particle. Furthermore, another source of error occurs since particles with a larger velocity have been found to be preferentially measured as a consequence of the relative geometry of the three probe volumes, leading to biased statistics.

The multiple-particle error arises as a consequence of the probability of one particle passing through the probe volume of one of the 1D LV channels within the coincidence time interval $t_c$ after another particle passes through the probe volumes associated with the other 1D LV channels. Such an occurrence may lead to a system event with the prior art coincidence test even were the several particles to pass only through those regions of the several probe volumes which do not overlap. Since the different particles may have different velocities, deduction of velocity from such a resultant system measurement would be in error.

The geometric-bias error arises as a consequence of the ability of a particle with a sufficiently large velocity to pass through those regions of the several different ellipsoidal probe volumes which do not physically overlap and yet satisfy the fixed coincidence-time-window test as used in the prior art, see FIG. 1. Particle a depicted in FIG. 1 travels through the overlapping region of the probe volumes 18 and 20. Particle a will be measured regardless of velocity. Particle b travels through both probe volumes 18 and 20 but not through the overlapping region. If particle b's velocity is fast enough to travel through both probe volumes in the time duration $t_c'$ then the fixed coincidence-time-window test is successfully met and a system measurement will occur. Thus, particles with a large velocity have a higher probability of being measured. Furthermore, such particles will have a preferred flow angle which lies in the plane of crossing of the several ellipsoidal probe volumes. An important intent of the present invention is to restrict those measurements that lead to system events to only those single particles which pass through the common overlapping region of the several (three) probe volumes.

Accordingly, it is an object of this invention to provide a laser Doppler velocimetry apparatus having a coincidence or simultaneity check of increased accuracy, thus producing more accurate measurements.

It is another object of the invention to provide such a laser Doppler velocimetry apparatus in which false indications of a single particle being detected in the apparatus are reduced.

It is a further object of the invention to provide such a laser Doppler velocimetry apparatus in which preferential measurement of larger velocity particles is reduced.

It is still another object of the invention to provide such a laser Doppler velocimetry apparatus having an increased extent of interaction between multiple channels in the apparatus.

The attainment of these and related objects may be achieved through use of the novel three-dimensional laser Doppler velocimeter and simultaneity detector herein disclosed. A three-dimensional laser Doppler velocimeter in accordance with this invention has a first measurement channel including a first detecting means positioned to receive light scattered by a particle present in the probe volume associated with the first laser optics. At least second and third measurement channels include second and third detecting means respectively positioned to receive light scattered by a particle present in the probe volumes associated with the second and third laser optics. The first, second and third measurement channels are connected to a means for determining coincidence of an event to be measured by the laser velocimeter. The first measurement channel is connected to supply the measurement burst and measured event signals to the means for determining coincidence of an event and to inhibit the second and third measurement channels from supplying measured event signals to the means for determining coincidence of an event in absence of measurement burst signals from the first measurement channel.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
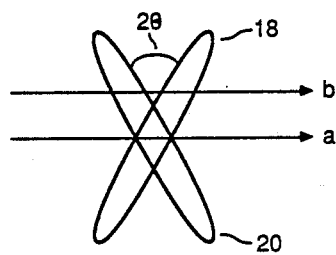
FIG. 1 is a drawing which depicts the ellipsoidal probe volumes of a typical 3D laser Doppler velocimeter.
Figure 2:
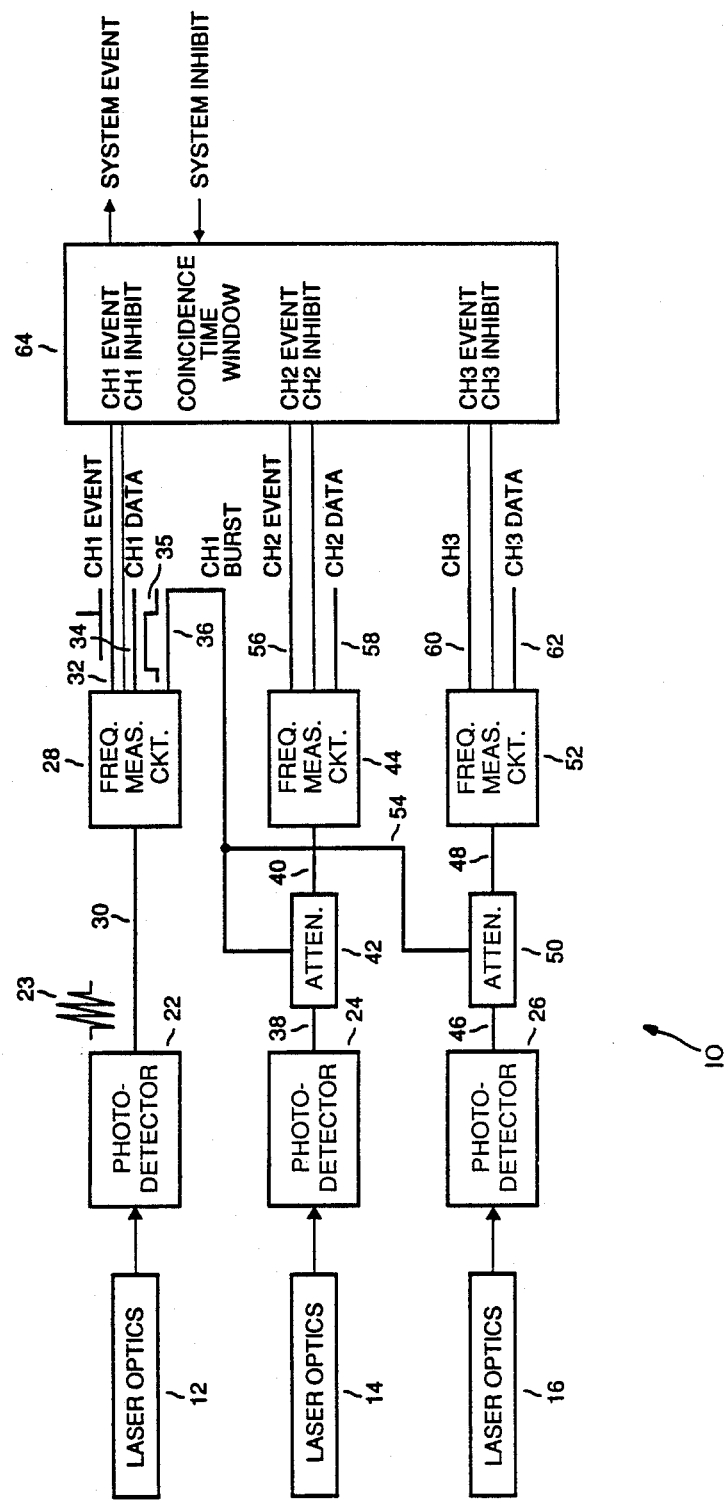
FIG. 2 is a block diagram of a laser Doppler velocimeter in accordance with the invention.

Turning now to the drawings, more particularly to FIG. 2, there is shown a laser Doppler velocimeter 10 in accordance with the invention. The laser Doppler velocimeter 10 has laser optics 12, 14 and 16 for channels 1, 2 and 3, respectively. The laser optics 14 and 16 are oriented so that ellipsoidal probe volume 20 (FIG. 1) coincides for channels 2 and 3 and laser optics 12 are oriented so that ellipsoidal probe volume 18 intersects the probe volume 20 in an acute angle $2\theta$. The channel 1 photodetector 22 is positioned to receive scattered light from a particle passing through the probe volume 18. The channel 2 and 3 photodetectors 24 and 26 are positioned to receive scattered light from a particle passing through the probe volume 20. The photodetector 22 for channel 1 is directly connected to provide a channel 1 analog signal 23 (see also FIG. 3) to frequency measuring circuits 28 on line 30. Channel 1 is therefore a primary channel for the system. The frequency measuring circuits 28 provide a channel 1 event signal on line 32, a channel 1 data signal on line 34, and a channel 1 measurement burst signal 35 on line 36.

Photodetectors 24 and 26 are respectively connected by lines 38 and 40 through a channel 2 analog signal attenuator 42 to frequency measuring circuits 44 and by lines 46 and 48 through a channel 3 analog signal attenuator 50 to frequency measuring circuits 52. Line 36 connects the channel 1 frequency measuring circuits 28 to the channel 2 attenuator 42, and lines 36 and 54 connect the channel frequency measuring circuits 28 to the channel 3 attenuator 50. Channels 2 and 3 are therefore secondary channels, with the channels 2 and 3 analog signal attenuators 42 and 50 controlled by the channel 1 measurement burst signal 35 on line 36. The channels 2 and 3 analog signal attenuators 42 and 50 attenuate the channels 2 and 3 analog signals only when the measurement burst signal 35 is false. The channel 2 frequency measuring circuits 44 provide a channel 2 event signal on line 56 and a channel 2 data signal on line 58. The channel 3 frequency measuring circuits 52 provide a channel 3 event signal on line 60 and a channel 3 data signal on line 62. The channel 1 event signal line 32, channel 2 event signal line 56 and the channel 3 event signal line 60 are connected to coincidence time window circuits 64 in the same manner as conventional laser Doppler velocimeters.

Figure 3:
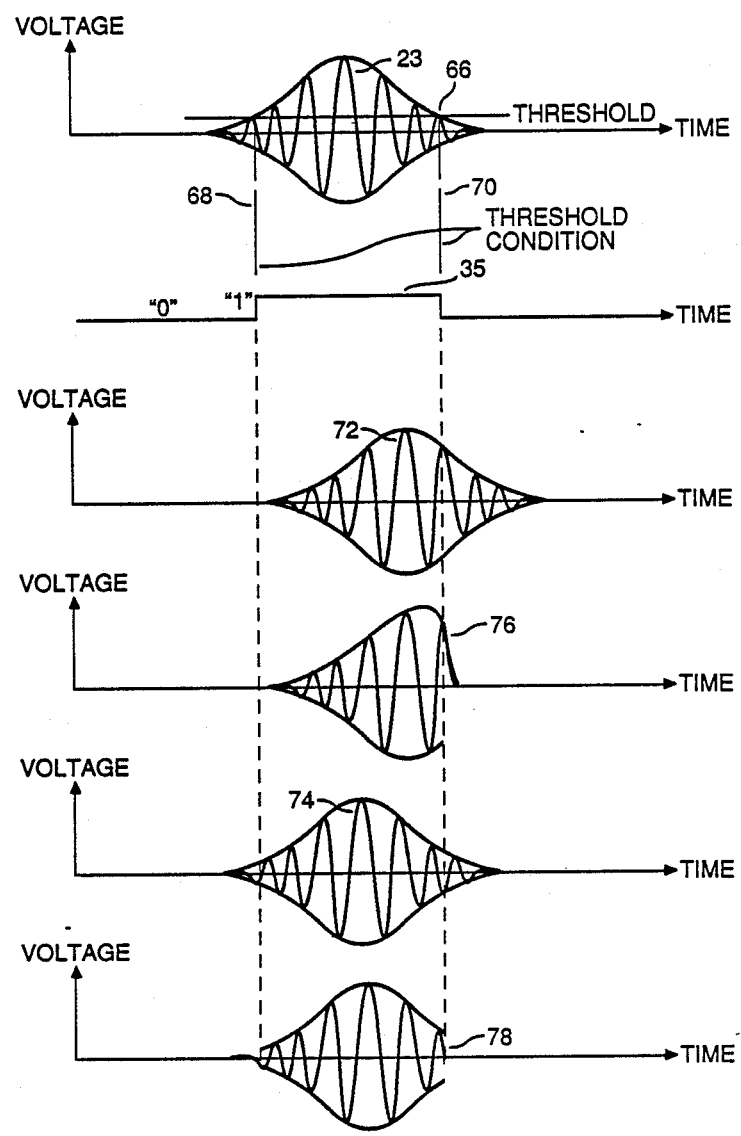
FIG. 3 is a set of waveforms useful for understanding operation of the laser Doppler velocimeter of FIG. 2.

The waveforms of FIG. 3 help to explain operation of the laser Doppler velocimeter 10. The channel 1 analog signal 23 crosses a threshold 66, establishing threshold conditions at 68 and 70, which are used to define the channel 1 measurement burst signal 35. The channel 1 measurement burst signal is true for the time duration that a particle is sensed in the probe volume 18 associated with the primary channel. The secondary channel photodetectors 24 and 26 have their analog signals 72 and 74 attenuated by the attenuators 42 and 50 as indicated at 76 and 78 if the primary channel measurement burst 35 is false. Their analog signals are not attenuated if the primary channel measurement burst 35 is true. Thus, the secondary channel frequency measuring circuits 44 and 52 can accomplish measurements only if a particle is present simultaneously both in the ellipsoid probe volume associated with the respective secondary channel and in the ellipsoid probe volume associated with the primary channel. The coincidence-time-window concept is also used as in the prior art.

Figure 4:
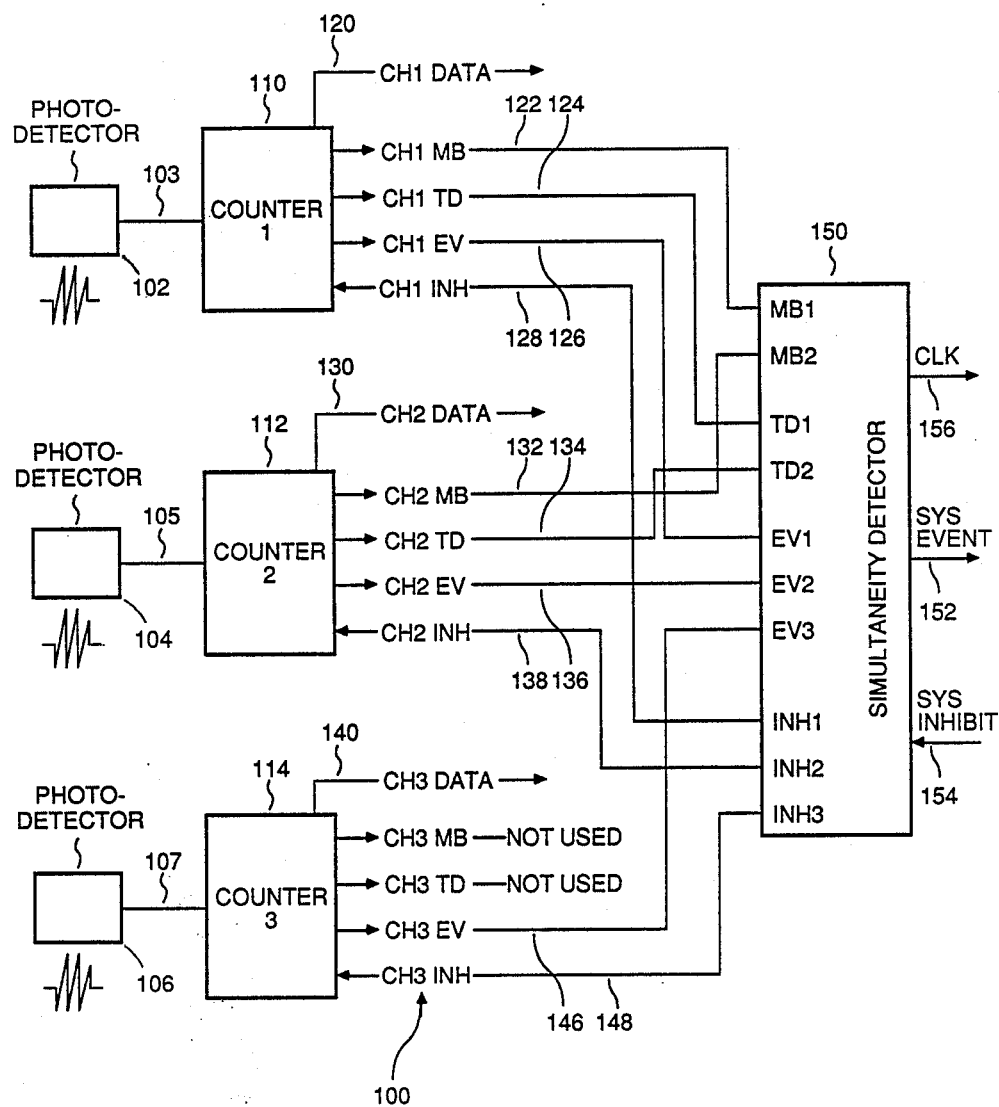
FIG. 4 is a block diagram of another embodiment of a laser Doppler velocimeter in accordance with the invention.

FIG. 4 shows part of high speed digital electronics 100 for a 3D LV instrument. As in the FIG. 2 embodiment, photodetectors 102, 104 and 106 are positioned to receive light scattered by a particle present in the probe volume associated with their respective laser optics. The photodetectors 102, 104 and 106 are respectively connected by lines 103, 105 and 107 to counter circuits 110, 112 and 114. Channel 1 counter circuit 110 is connected to simultaneity detector circuits 150 by a channel 1 measurement burst line 122, a channel 1 threshold detect line 124, a channel 1 event pulse line 126 and a channel 1 inhibit line 128. Channel 2 counter circuit 112 is connected to the simultaneity detector circuits 150 by a channel 2 measurement burst line 132, a channel 2 threshold detect line 134, a channel 2 event pulse line 136 and a channel 2 inhibit line 138. Channel 3 counter circuit 114 is connected to the simultaneity detector circuits 150 by a channel 3 event pulse line 146 and a channel 3 inhibit line 148. Depending on the output of the simultaneity detection circuit, digital data is provided from the counters 110, 112, and 114 on digital data lines 120, 130 and 140 to the data acquisition system. As in the FIG. 2 embodiment, channel 1 and channel 2 receiving optics view the physically distinct probe volumes 18 and 20 respectively.

Figure 5:
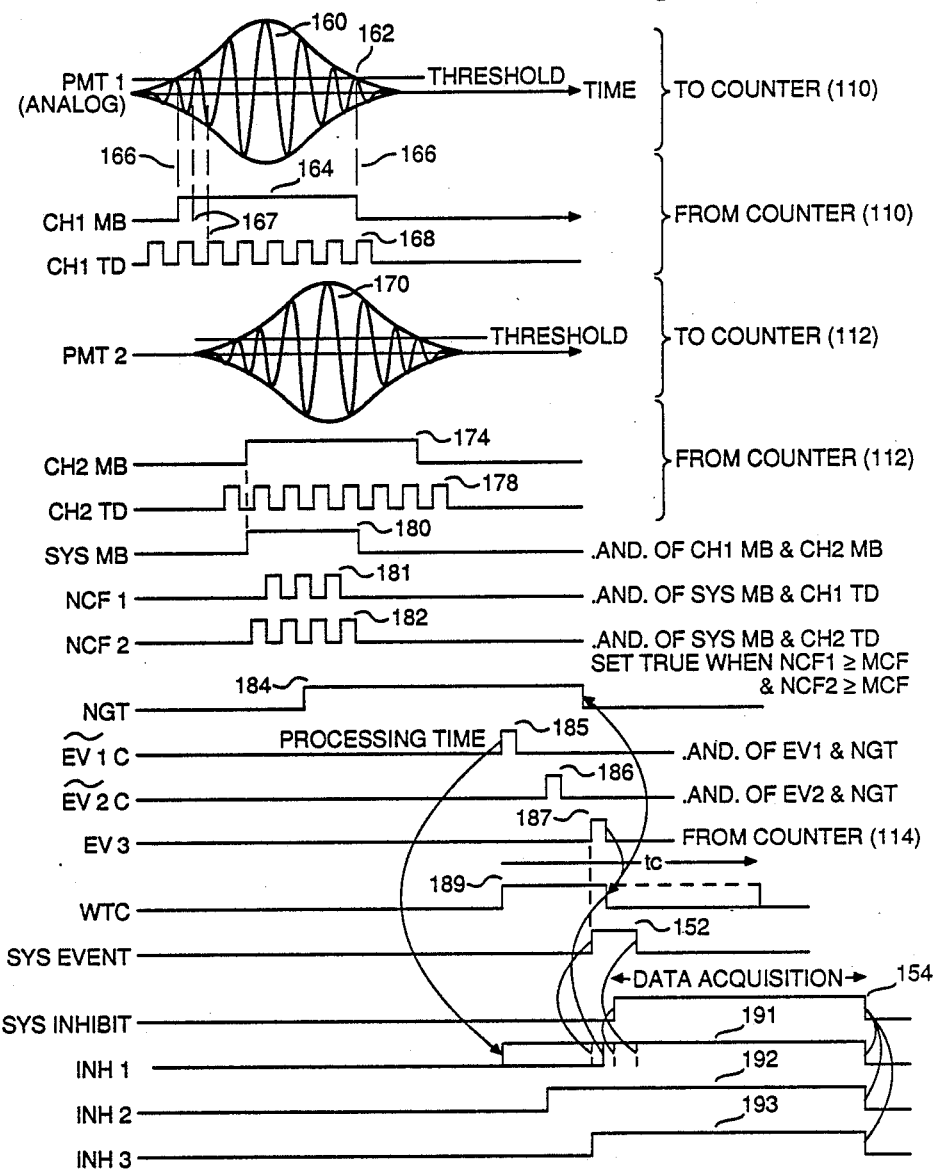
FIG. 5 is a set of waveforms useful for understanding operation of the laser Doppler velocimeter of FIG. 4.

The waveform diagrams of FIG. 5 help to explain operation of the detection electronics 100. Analog signal 160 is supplied from photodetector 102 (on line 103) as an input to channel 1 counter 110. For the channel 1 counter 110, when the signal 160 exceeds threshold 162, channel 1 measurement burst signal 164 goes high until the signal 160 again drops below the threshold 162, as indicated at 166. Channel 1 threshold detect pulses 168 are established by zero crossings of the signal 160, as indicated at 167. A channel 1 event signal on line 126 is generated by the counter 110 after digital processing and signal validation by the counter has been successfully accomplished and digital data is ready for data acquisition on line 120.

Channel 2 counter (112) generates the channel 2 measurement burst 174 (on line 132), the channel 2 threshold detect 178 (on line 134) and channel 2 event (on line 136) in a similar manner (as counter 110) except using the input signal 170 (on line 105) from photodetector 104. Likewise, channel 3 counter (114) generates the event signal 187 (on line 146) provided a successful measurement of the photodetector 106 signal is accomplished and digital data is ready for data acquisition on line 140.

Within the simultaneity detection circuit 150, a system measurement burst 180 is generated which is high when and only when both channel 1 and channel 2 measurement bursts 164 and 174 are high. The system measurement burst may be used as an indication of a particle present in both probe volumes 18 and 20. The NCF1 signal 181 is generated by a logical AND of the system measurement burst 180 and the channel 1 threshold detect 168, and thus represents fringe crossings of a particle in probe volume 18 while there is also a particle in probe volume 20. The NCF2 signal 182 is generated by a logical AND of the system measurement burst 180 and the channel 2 threshold detect 178, and thus represents fringe crossings of a particle in probe volume 20 while there is also a particle in probe volume 18. Signal NGT (184) is generated high when the count of NCF1 and NCF2 equals or exceeds a user-selectable minimum fringe count MCF (typically 2,4 or 8). A true (or "high") NGT signal thus represents the situation where a particle (or particles) have been simultaneously resident in both probe volumes 18 and 20 for a minimum number of fringe counts (MCF) of their respective associated channels 1 and 2.

The conditional channel 1 event signal 185 (Ev1c) is generated by the logical AND of the NGT signal 184 and the channel 1 event signal occurring on line 126. The conditional channel 1 event pulse is thus generated only when a successful measurement has been accomplished by channel 1 and a particle (or particles) have been simultaneously present in both probe volumes 18 and 20. In a similar manner, the conditional channel 2 event signal 186 (Ev2c) is generated by the logical AND of the NGT signal 184 and the channel 2 event signal occurring on line 136. The channel 3 event signal 187 (Ev3 on line 146) may now be used as presented by the counter 114, along with the conditional channel 1 and 2 event signals 185 and 186 in a coincidence time window test.

The first to occur of signals 185, 186 and 187 will start a coincidence-time-window signal 189 of duration $t_c$ which may be operator adjustable. Provided that the remaining signals of 185, 186 and 187 also occur during the time $t_c$ that signal 189 is high, then the system event signal 152 will be generated. Upon generation of the system event signal 152, signal 189 is set low even prior to expiration of the time interval $t_c$. If all three signals 185, 186 and 187 do not occur during the time interval $t_c$ that signal 189 is high, then no system event is generated.

NGT is set low by the coincidence-time-window signal 189 transition to low. NGT is also set low on either of the channel 1 or 2 measurement burst (164 or 174) transition low-to-high. Thus, if a second channel 1 measurement burst or a second channel 2 measurement burst should occur after NGT is set high then NGT will be set low. Furthermore, the NGT transition to low will reset the count of NCF1 and NCF2 to zero.

The channel 1 inhibit 191 is set high (within the simultaneity detection circuit 150) by the transition of the conditional channel 1 event 185, and is reset low by the transition to low of coincidence-time-window signal 189. The channel 1 inhibit may also be held high by either the system event pulse 152 (sent to the data acquisition system) or the system inhibit pulse 154 (received from the data acquisition system). The channel 2 and 3 inhibit signals 192 and 193 are generated in like manner to the channel 1 inhibit signal 191 except those respective signals associated with channels 2 and 3 are used. The function of the channel inhibit when set high is to prevent the respective channel from generating a channel event and updating the output data. The channel inhibit set high should not prevent generation of either the channel measurement burst nor the threshold detect signals.

The system event pulse 152 is used to initiate acquisition of the data on lines 120, 130 and 140 by the data acquisition system. Additionally, a clock count may be made available on line 156 to establish the time interval since the last system event. Since time is required for data acquisition, the data acquisition system supplies the system inhibit pulse 154 to prevent updating of the data during the acquisition process.

Figure 6:
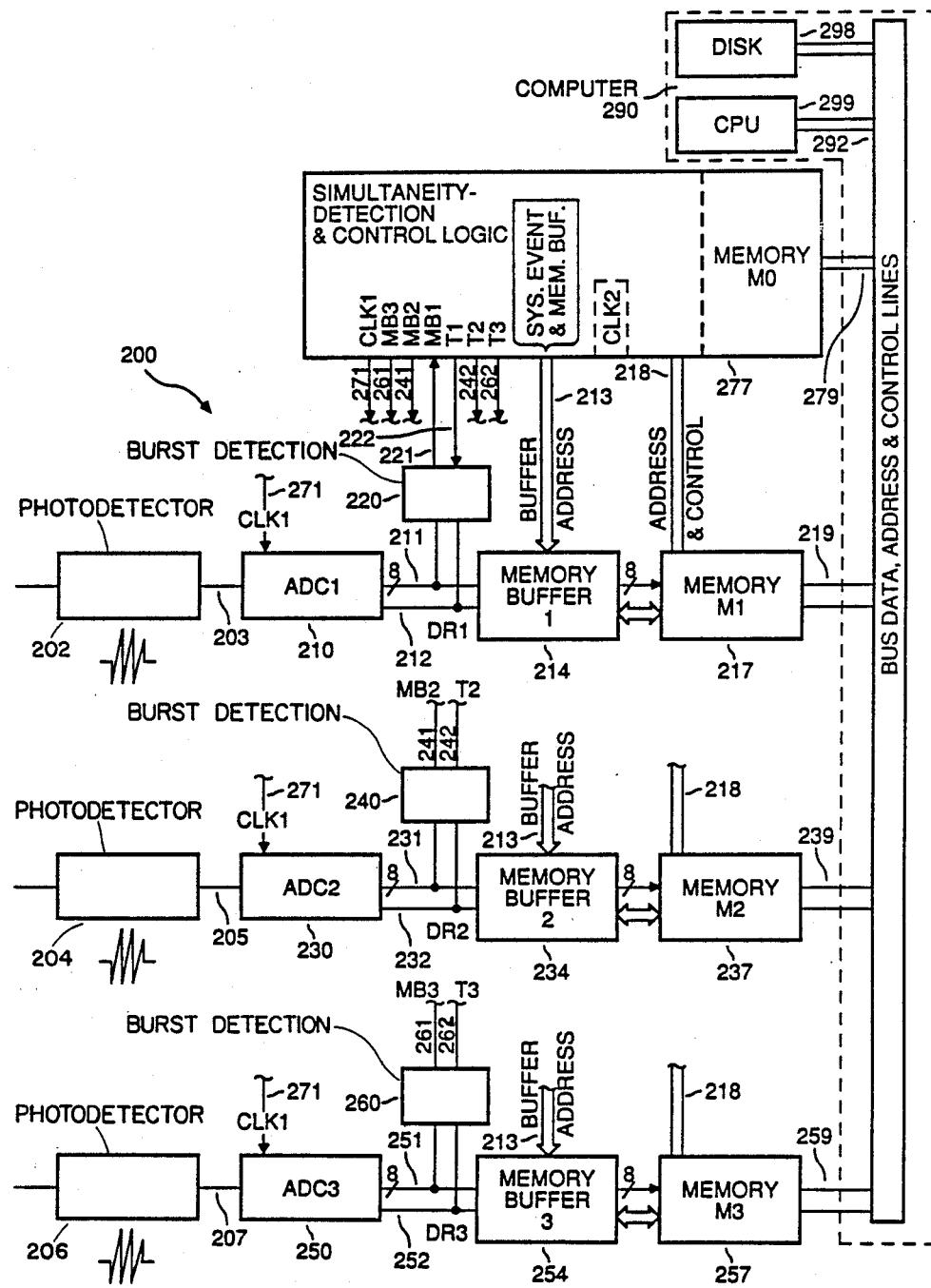
FIG. 6 is a block diagram of a third embodiment of a laser Doppler velocimeter in accordance with the invention.

FIG. 6 is a block diagram of a 3D LV data processing system 200 based on the use of analog-to-digital converters (ADC) 210, 230 and 250 for the analog burst signals from the photodetectors 202, 204 and 206 with subsequent processing of this digital data for frequency content within the signal burst of each LV channel by means of a computer 290 using a software-based numerical algorithm. An important feature of this embodiment of the simultaneity-detection invention is the ability (in an ADC-based form of a 3D LV signal processor system) to determine the degree to which the signal bursts in the several channels overlap. Such a time-duration overlap in the several bursts is indicative of a single particle present in the physically overlapping region of the several physically distinct 1D LV probe volumes (see FIG. 1). This burst overlap information may be used both real-time to initiate the data transfer process and also in post-acquisition may be reconstructed from the stored data to more rigorously analyze the burst signals for frequency, burst-duration and burst-overlap information. One particular advantage of such an ADC-based 3D LV signal processing system is the ability to acquire accurate 3D LV data in low signal/noise environments. Furthermore, statistical information on probe volume overlap can be deduced that will enable the operator to adjust the 3D LV laser optics for an improved optical alignment.

In the FIG. 6 embodiment, as for the FIG. 2 and the FIG. 4 embodiment, photodetectors 202, 204 and 206 are positioned to receive light scattered by a particle present in the probe volume associated with their respective laser optics. The photodetectors 202, 204 and 206 are respectively connected by lines 203, 205 and 207 to analog-to-digital converter circuits 210, 230 and 250. A CLK1 clock pulse 271 (with fixed, but user-selectable, time intervals between pulses) is generated in the simultaneity-detector and control logic circuits 270 and is connected to the channel 1, 2 and 3 analog-to-digital converter circuits 210, 230 and 250. This CLK1 clock pulse is used to trigger each of a regular succession of evenly-spaced (in time) analog-to-digital conversions by circuits 210, 230 and 250. In an example implementation of this embodiment, the CLK1 clock pulse may occur at a user-selected rate of one pulse every 4 nanoseconds. As a consequence, at a rate equal to the CLK1 clock pulse rate, digital data (typically 8 bits or one byte each, representing the instantaneous voltage of the analog signals on lines 203, 205 and 207) will be presented by the analog-to-digital converter circuits 210, 230 and 250 on digital data lines 211, 231 and 251 respectively. A small amount of time is required to accomplish the analog-to-digital conversion, and data-ready pulses DR1, DR2 and DR3 are respectively generated by the analog-to-digital circuits on lines 212, 232 and 252 when the conversion is accomplished and digital data is available on lines 211, 231 and 251 for channels 1, 2 and 3 respectively. Should a second CLK1 clock pulse occur before the data-ready pulse, then an error condition is indicated, an LED turned on to warn the user, and a reset command issued to reinitialize the system circuits.

Channel 1 burst-detection circuit 220 is connected to the analog-to-digital converter circuit 210 digital data on lines 211, to the DR1 data-ready line 212 (alternatively, the CLK1 clock pulse 271) and to the simultaneity-detector and control logic circuits 270 by the channel 1 measurement burst line 221 and by the channel 1 threshold-level lines 222. Channel 2 burst-detection circuit 240 is connected to the analog-to-digital converter circuit 230 digital data on lines 231, to the DR2 data-ready line 232 (alternatively, the CLK1 clock pulse 271) and to the simultaneity-detector and control logic circuits 270 by the channel 2 measurement burst line 241 and by the channel 2 threshold-level lines 242. Channel 3 burst-detection circuit 260 is connected to the analog-to-digital converter circuit 250 digital data on lines 251, to the DR3 data-ready line 252 (alternatively, the CLK1 clock pulse 271) and to the simultaneity-detector and control logic circuits 270 by the channel 3 measurement burst line 261 and by the channel 3 threshold-level lines 262. The burst-detection circuits 220, 240 and 260 may operate by either an amplitude-detection principle or an energy-detection principle.

In the amplitude-detection principle, the maximum digital amplitude detected on the data lines 211 for the last Ilag (user selected) pulses of the CLK1 clock is compared with the (user selected) digital data level presented on threshold-level lines 222. If this maximum digital amplitude occurring over Ilag pulses of the CLK1 clock exceeds the threshold-level then the channel 1 measurement burst digital signal 221 is set true by the burst-detection circuits 220. Otherwise, the channel 1 measurement burst signal is set false. Channel 2 and 3 measurement burst signals 241 and 261 are set true or false in a similar manner except using digital data lines 231 and 251 and threshold lines 242 and 262 respectively. In an example implementation of this embodiment, the threshold lines 222, 242 and 262 may each carry an 8-bit digital representation of the amplitude that the 8-bit digital data on lines 211, 231 and 251 must exceed at some time during the last Ilag=8 pulses occurring at 4 nanoseconds intervals of the CLK1 clock signal 271.

In the energy-detection principle, the sum of the energy contained in the signal on the data lines 211 during the last (user selected) Ilag pulses of the CLK1 clock is compared with the (user-selected) digital data level presented as threshold-level lines 222. To establish this energy sum, the data on the lines 211 is squared (or taken to some other higher even power) by digital logic circuits, forming a new digital word representing the instantaneous signal energy at time $t_i$. Then this square result is put into a First-in-First-out (FIFO) shift register of length Ilag and also added to the channel 1 energy-sum register, Esuml. The digital data word representing the energy of the signal at time $(t_{i-Ilag})$ is then removed from the shift register and subtracted from the energy sum register, Esuml. If the contents of the energy sum register, Esuml, exceeds the threshold-level established by lines 222 then the channel 1 measurement burst digital signal 221 is set true by the burst-detection circuits 220. Otherwise, the channel 1 measurement burst signal is set false. Channel 2 and 3 measurement burst signals 241 and 261 are set true or false by circuits 240 and 260 in a similar manner except using digital data lines 231 and 251 and threshold lines 242 and 262 respectively. In an example implementation of this embodiment, after a CLK1 clock pulse at time $t_i'$ the 16-bit Esuml register of the channel 1 burst-detection circuit 220 would contain a digital word that represents the sum (over the last Ilag=8 pulses of the CLK1 clock) of the 12-bit square of the top 6-bits of the 8-bit word appearing on line 211. Contained in the FIFO shift register would be the last Ilag=8 12-bit data words representing the square of the voltages at times $t_i'$ $t_{(i-1)}'$ ..., $t_{(i-Ilag+1)}$, spaced 4 nanoseconds apart. Established by the threshold lines 222 would be a 16-bit word representing the value which the 16-bit Esuml register must equal or exceed in order that the channel 1 measurement burst signal 221 be set true.

Within the simultaneity-detector and control logic circuits 270, the measurement burst signals 221, 241 and 261 are logically ANDed to form SYS_burst (the system measurement burst signal). The occurrence of this system measurement burst signal pulse is then used in control of transfer of data to the memory buffer circuits 214, 234 and 254. In an example implementation of this embodiment, a SYS_Lstart logic signal is set high and a SYS_Cstart counter starts counting CLK1 clock pulses upon the start of a system measurement burst (leading edge transition of SYS_burst. At the finish of a system measurement burst (e.g. at the trailing-edge of the SYS_burst pulse, and provided the system measurement burst signal remained high for a minimum number of CLK1 clock pulses) a SYS_end logic signal goes high. Furthermore, for channels 1, 2 and 3 respectively, a CHN1_end, a CHN2_end and a CHN3_end logic signal is set high at the trailing-edge of the respective channel's measurement burst signal provided the SYS_Lstart logic signal is high. When the logical AND of the four signals, SYS_end, CH1_end, CH2_end and CH3_end goes high, then a successful system measurement is considered to have been completed, a SYS_EVENT pulse occurs and the data transfer from bank0 of the memory buffer circuits 214, 234 and 254 to the memory circuits 217, 237 and 257 as described below is initiated. Further, the digital data stream from the analog-to-digital converters 210, 230 and 250 would subsequently be written to the alternate bank1 of the memory buffer circuits 214, 234 and 254. Upon a subsequent successful system measurement occurring with data in bank1 of the memory buffer circuits, and provided that the data in bank0 has been transferred to the memory circuits, then the roles of bank0 and bank1 would then once again be reversed.

A SYS_EVENT pulse initiating the data transfer process may also occur if the SYS_Cstart counter equals the memory buffer length. This will account for the case where a particle resides in the common volume of the three ellipsoidal probe volumes longer than the time taken to fill one bank of the memory buffer.

The occurrence of the SYS_EVENT pulse clears the SYS_start, SYS_end, CH1_end, CH2_end and the CH3_end logic signals. Furthermore, the CLK2 counter and the MEM_BUF memory-buffer-address register contents described below are latched and then written to the M0 memory present in the simultaneity-detection and control logic circuits. Once latched, the CLK2 counter is cleared and counting resumed from 0.

The CLK2 counter is a counter which counts the pulses of a second CLK2 clock running at a user-selectable rate, typically much slower than the CLK1 clock (e.g., 100 kHz). The contents of the CLK2 counter indicates the time since the last SYS_EVENT pulse.

The M0 memory 277 is dual-ported memory associated with the simultaneity-detection and control logic circuits. The CLK2 counter contents and MEM_BUF memory-buffer-address register contents are written to sequential locations in M0 memory for each SYS_event. The M0 memory circuits also provide read/write access by the computer 290 described below. In the event of a CLK2 overflow, the CLK2 counter contents and the MEM_BUF register contents are written to M0 with all bits set to 1, and no transfer of the data contents in the memory buffer to M1, M2 or M3 would ensue. Upon later analysis, all 1's being set in the memory array associated with the simultaneity-detection and control logic circuits registers will indicate a CLK2 overflow. Other data information (e.g. wind-tunnel pressure or temperature) being measured at the time of a SYS_event may also be stored sequentially in the M0 memory if desired.

An inhibit signal, SYS_inh1, may be set high (or low) either under software control (by the computer 290) or by an external control line. If SYS_inh1 is set high, then the SYS_burst signal is forced low, suppressing acquisition of data. In the instance that the next bank of memory buffer is unavailable as of yet for accepting data, a second inhibit signal, SYS_inh2, is set high. When the SYS_inh2 is set high AND a SYS_event signal occurs, then the SYS_event signal is ignored (except that SYS_L_start, SYS_end, CH1_end, CH2_end and CH3_end are still cleared) and the CLK2 counter is allowed to continue without reset. Once the next bank of memory buffer is ready for accepting data, the SYS_inh2 is set low.

The channel 1 memory-buffer circuits 214 typically consists of two (or preferably more, but possibly one) banks of high-speed digital memory, with address and bank-switching controls (an alternative implementation would use shift registers). The purpose of the channel 1 memory-buffer circuits 214 is to provide a temporary storage location consisting of a relatively small amount of (expensive) high-speed memory that will accept the relatively short-duration digitized signal burst from the channel 1 analog-to-digital converter circuits 210. The access times of this memory buffer must be compatible with the fastest user-selectable CLK1 clock rate. The digital data from the analog-to-digital converter is, after every CLK1 clock pulse (and upon the data-ready pulse), being written into this memory buffer, at a memory-buffer address which is incremented every CLK1 clock pulse. A MEM_BUF memory-buffer-address register in the simultaneity-detector and control logic circuits is also incremented and thus reflects the last address written to in the memory buffer. After the last address in the memory buffer (say Octal 377 if the bank of memory buffer is 256 bytes) is written into, then the next address written to is Octal 000, the first memory buffer address. Each channel memory buffer is written to in the same bank (bank0 or bank1) and memory-buffer address, but in the circuit 214, 234 or 254 for that channel.

Once a coincident LV burst has been found to occur by the burst-detection circuits and by the simultaneity-detector and control logic circuits (as evidenced by the SYS_event signal), the digital data contents of the channel 1 memory buffer will be transferred to the larger, less expensive but slower M1 memory circuits 217. Two banks of memory in the memory buffer circuits will enable the analog-to-digital converter to write the output data stream from the analog-to-digital converter circuits to the second bank of temporary memory buffer storage while the data representing a valid LV signal burst present in the first bank of temporary memory-buffer storage is written to the larger memory circuits 217.

Channels 2 and 3 memory buffer circuits 234 and 254 are similar to the channel 1 memory buffer circuits 214 except using signal lines appropriate to the respective channels. The bank (there being typically at least two) and address being written to in each of the several memory buffer circuits 214, 234 and 254 are the same and thus only one memory buffer address register is required in the simultaneity-detector and control logic circuits. Furthermore, the same address location in a given burst for the different channels will, upon the later analysis to be described, reflect data in the different channels acquired at the same instant of time.

The channel 1 memory circuits 217 consist of a large quantity (e.g., 4 Megabyte) of slower memory (perhaps 100 nanosecond access time) in which is accumulated (say during a wind-tunnel experiment) a large number of the channel 1 LV bursts for which the simultaneity-detector and control logic circuits have found particles to be present in all three channels at the same time. The contents of the memory buffer 214 are written to successive locations in the M1 memory circuits 217 under control of the control logic circuits 270 and hand-shaking signals to and from the memory buffer circuits. The channel 2 and 3 memory circuits 237 and 257 are similar to the channel 1 memory circuits 217 except the appropriate channel 2 and 3 signals and circuits are used.

The memory circuits 217 are double-ported in that in addition to being written to by the memory-buffer circuits 214, the memory circuits also act as conventional read/write memory in a computer system 290. This computer system may be public-domain VME-bus based, Multi-bus based or of other design. The contents of the M1, M2 and M3 memory circuits 217, 237 and 257 as well as the M0 memory circuits 277 may be transferred to a disk unit 298 for long term storage and later analysis or may be analyzed immediately by the CPU 299, possibly with the assistance of a hard-wired Fast-Fourier Transform or Array processor using numerical algorithms.

Table I is a listing of the major steps taken by software in the acquisition of data with the 3D LV system of FIG. 6. Certain parameters, such as the SYS_inh1, CLK1 rate, CLK2 rate, various threshold criterion, etc. may alternatively be set by external panel-mounted controls or switches, but here are shown as being under software control of an executing data acquisition program. To set these signals and parameters by means of software control, corresponding control-logic circuitry addressable by the CPU must be incorporated into the 3D LV embodiment of FIG. 6. Such additional control-logic circuitry is present in the available art and will not be elaborated on here.

TABLE I. Main Program Steps for 3D LV data acquisition by embodiment of FIG. 6.
1. Set SYS_inh1 high and issue system reset.
2. Establish x,y,z location of 3D LV probe volume in wind tunnel.

3. Set BUFF_length (if more than one length of memory buffer is implemented, e.g., 256, 512 or 1024 bytes).
4. Set CLK1 rate (e.g., 250 MHz).
5. Set CLK2 rate (e.g., 100 kHz).
6. Set threshold criterion for each channel:
   a. Energy- or amplitude-principle?
   b. Set threshold level for each channel
7. Set Nburst, the number of bursts of BUFF_length above to be acquired per channel in this loop.
8. Take data. Do this by setting SYS_inh1 low and wait till Nburst "bursts" have been taken as indicated by bus interrupt signal being generated by the Simultaneity Detector and Control Logic circuits.
9. Transfer data from M0, M1, M2 and M3 memory to disk unit for later burst duration, burst overlap and spectral anaylsis.
10. More data (at new x,y,z)?

If so, then go to step 1.
If not, then stop execution of this program.

Step 1 of the data acquisition software of Table I simply ensures the initialization of the hardware through issue of a system reset and setting the SYS_inh1 logic signal high to inhibit the LV processor 200. Step 2 would be taken in a typical wind-tunnel experiment application of this 3D LV system where data is taken at various locations (x,y,z) in a flowfield. Steps 3, 4, 5, 6 and 7 establish those 3D LV system hardware parameters which are under software control. Step 7, in particular, establishes the number of system bursts (Nbursts) to be taken for this program loop while the probe volume remains at the fixed (x,y,z) established in step 2. Note that Nburst*BUFF_length (where, BUFF_length is the length of the memory buffer circuits 214, 234 and 254) must not exceed the amount of memory in the memory circuits (217, 237 and 257). This restriction may be avoided with incorporation of a bank-switched design of the memory circuits 217, 237 and 257 to allow the simultaneous parallel operations of data transfers from memory-buffer to one bank of memory and of data transfers from another bank of memory to disk, with appropriate bus interrupts generated upon filling a bank in the memory circuits with data. Step 8 accomplishes the actual data-acquisition by setting SYS_inh1 low. Upon acquisition of Nburst system bursts, the simultaneity detection and control logic circuits issue an interrupt signal on the system bus. Incorporation of this interrupt signal into control logic is part of prior art specific to the particular bus design used. Upon the interrupt signal, the software proceeds to step 9, where data in the M0, M1, M2 and M3 memory circuits are transferred to disk for later analysis. Depending on whether more data is desired the program execution then begins again at step 1 or the program stops.

From the viewpoint of the software program, the data contents of M0, M1, M2 and M3 will appear as byte or integer word arrays. The array M0 will be an integer word array of length 2*Nburst, with each word typically 2 bytes long. Each of M0, M1 and M2 will appear to the software as byte arrays of length Nburst*BUFF_length. For the arbitrary $i_{th}$ system burst, M0(1,i) will represent the location in the M1, M2 and M3 arrays of the last data taken for the $i_{th}$ burst, and M0(2,i) will represent counts of the CLK2 clock since the previous (i-1) system burst. The time interval since the last system burst, $dt_i = t_i - t_{i-1}$, will then equal to float (M0(2,i))/(CLK2 counts/−sec). A clock overflow condition is indicated if all bits in both the M0 (1,i) and M0 (2,i) are set equal to 1.

The channel 1 data acquired for the $i_{th}$ system burst is stored in a digital form in M1(j,i), where j=MOD(k +M0(1,i), BUFF_length) and k=1 to BUFF_length gives the proper time sequence of the data acquisition. The MOD function is the Modulo or the integer division remainder function which returns $MOD(n,m) = n - m*(n/m)$, where integer arithmetic is used. Digital data corresponding to the channel 1 M1 (j,i) for channels 2 and 3 and at identical times are stored in the M2(j,i) and M3(j,i) arrays. Note that due to the design of the 3D LV system 200, the M1, M2 and M3 data arrays are precisely aligned as to the time of analog-to-digital conversion, which enables a thorough determination of burst duration and overlap to be established by a (post-acquisition) software analysis program. Such burst duration and overlap information aids in determining validity of the data as representing a single particle in the common probe volume and also as a weight function to reduce the effect of noise in the spectral analysis of the acquired 3D LV data.

It should now be readily apparent to those skilled in the art that a novel three-dimensional laser velocimeter simultaneity detector capable of achieving the stated objects of the invention has been provided. The simultaneity detector of this invention increases the interaction between multiple channels in the apparatus, thus reducing false indications of single particle being detected in the apparatus and a bias in favor of larger velocity particles. The resulting increased accuracy produces more accurate LDV measurements.

It should further be apparent to those skilled in the art that various changes in form and details of the invention as shown and described may be made. It is intended that such changes be included within the spirit and scope of the claims appended hereto.

WHAT IS CLAIMED IS:

1. In a three-dimensional laser velocimeter including first, second and third laser optics, a simultaneity detector, which comprises a first measurement channel including a first detecting means positioned to receive scattered light from a particle present in said first laser optics, at least second and third measurement channels including second and third detecting means respectively positioned to receive scattered light from a particle present in said second and third laser optics, said first, second and third measurement channels being connected to a means for determining coincidence of three channel events to establish a system event to be measured by the laser velocimeter, said first measurement channel being configured and connected to supply a measurement burst signal, indicating presence of a particle in the first laser optics, and a measured channel event signal, indicating that the light scattered by the particle present in the first laser optics has been received by the first measurement channel, to said means for determining coincidence of the channel events to establish a system event, said second and third measurement channels being configured and connected to supply measured channel event signals, indicating that the light scattered by the particle present in the second and third laser optics has been received by said second and third measurement channels, and a means to inhibit said second and third measurement channels from supplying measured channel event signals to said means for determining coincidence of the channel events, said first measurement channel further being configured and connected to supply the measurement burst signal to said means to inhibit said second and third measurement channels from supplying measured channel event signals to said means for determining coincidence of the channel events, to establish a system event disabling said means to inhibit said second and third measurement channels.

2. The three-dimensional laser velocimeter simultaneity detector of claim 1 in which said first detecting means includes a first photodetector connected to a first frequency measuring circuit, said second and third detecting means include second and third photodetectors connected to supply input signals to second and third frequency measuring circuits through first and second attenuators, and said first frequency measuring circuit is connected to said first and second attenuators to attenuate the input signals from said second and third photodetectors to said second and third frequency measuring circuits in the absence of a measurement burst signal from the first frequency measuring circuit.

3. In a three dimensional laser velocimeter including first, second and third laser optics, a simultaneity detector, which comprises a first measurement channel including a first detecting means positioned to receive scattered light from a particle present in first laser optics, at least second and third measurement channels including second and third detecting means respectively positioned to receive scattered light from a particle present in second and third laser optics, said first, second and third measurement channels being connected to a means for determining coincidence of three channel events to establish a system event to be measured by the laser velocimeter and to inhibit said first and second measurement channels from supplying measured event signals to said means for determining coincidence of an event in the absence of a system event, said first measurement channel being configured and connected to supply a measurement burst signal, indicating presence of a particle in the first laser optics, and a measured channel event signal, indicating that the light scattered by the particle present in the first laser optics has been received by the first measurement channel, to said means for determining coincidence of the channel events to establish a system event, said second measurement channel being configured and connected to supply a measurement burst signal, indicating presence of a particle in the second laser optics, and a measured event signal, indicating that the light scattered by the particle present in the second laser optics has been received by the second measurement channel, to said means for determining coincidence of the channel events to establish a system event, said third measurement channel being connected to supply a measured event signal, indicating that the light scattered by the particle present in the third laser optics has been received by the third measurement channel, to said means for determining coincidence of the channel events to establish a system event and to inhibit said first and second measurement channels from supplying measured event signals to said means for determining coincidence of an event in the absence of an overlap in time of the measurement burst signals form said first and second measurement channels.

4. The three dimensional laser velocimeter simultaneity detector of claim 3 in which said first and second measurement channels include counter circuits for supplying the measurement burst signals and the measured event signals and said third measurement channel includes a counter circuit for supplying the measured event signal.

5. In a three dimensional laser velocimeter including first, second and third laser optics, a simultaneity detector, which comprises a first measurement channel including a first detecting means positioned to receive scattered light from a particle present in first laser optics, a second measurement channel including second detecting means positioned to receive scattered light from a particle present in second laser optics, a third measurement channel including third detecting means positioned to receive scattered light from a particle present in third laser optics, said first, second and third measurement channels being configured and connected to generate and supply first, second and third measurement burst signals to a means for determining coincidence of three channel events from a logical combination of the first, second and third measurement burst signals to establish a system event to be measured by the laser velocimeter, said first, second and third measurement channels further being configured to develop measurement data and to supply measurement data signals, and a means for storing information connected to receive the measurement data signals form said first, second and third measurement channels under control of said means for determining coincidence upon coincidence of the three channel events.

6. The three dimensional laser velocimeter simultaneity detector of claim 5 in which said first, second and third measurement channels include an analog to digital converter connected to supply the measurement data signals to said means for storing information.

7. A process for detecting simultaneity of measured bursts in a three-dimensional laser velocimeter and of acquiring data of the three-dimensional laser velocimeter, which comprises detecting scattered light from a particle present in first, second and third measurement channels including laser optics, generating data signals from the scattered light in the first, second and third measurement channels, determining coincidence of the scattered light in the first, second and third measurement channels, generating a control signal in the absence of coincidence of the scattered light in the first, second and third measurement channels, and using the control signal generated from the scattered light in the first measurement channel to inhibit the second and third measurement channels from supplying the data signals obtained from the scattered light in the absence of coincidence of the scattered light in the first, second and third measurement channels.

8. A process for detecting simultaneity of measured bursts in a three-dimensional laser velocimeter and of acquiring data of the three-dimensional laser velocimeter, which comprises detecting scattered light from a particle present in first, second and third measurement channels including laser optics, generating data signals from the scattered light in the first, second and third measurement channels, determining coincidence of the scattered light in the first and second measurement channels, and inhibiting the first, second and third measurement channels from supplying data signals obtained from the scattered light in the absence of coincidence of the scattered light in the first and second measurement channels.

9. A process for detecting simultaneity of measured bursts in a three-dimensional laser velocimeter and of acquiring data of the three-dimensional laser velocimeter, which comprises receiving light scattered from particles in first, second and third measurement channels including first, second and third laser optics, generating a first channel measurement burst signal, indicating presence of a particle in the first laser optics, a second channel measurement burst signal, indicating presence of a particle in the second laser optics, and at least a third channel measurement burst signal, indicating presence of a particle in the third laser optics, forming a system measurement burst by a logical combination of the several channel measurement burst signals and, upon occurrence of the system measurement burst, indicating presence of a particle simultaneously in the first, second and third laser optics, obtaining data during the system measurement burst, and acquiring time-synchronized data obtained by the first, second and third measurement channels during the system measurement burst.

* * * * *